United States Patent [19]

Trompf et al.

[11] Patent Number: 5,758,022
[45] Date of Patent: May 26, 1998

[54] METHOD AND APPARATUS FOR IMPROVED SPEECH RECOGNITION FROM STRESS-INDUCED PRONUNCIATION VARIATIONS WITH A NEURAL NETWORK UTILIZING NON-LINEAR IMAGING CHARACTERISTICS

[75] Inventors: Michael Trompf, Hemmingen; Heidi Hackbarth, Korntal, both of Germany

[73] Assignee: Alcatel N.V., Amsterdam, Netherlands

[21] Appl. No.: 271,128

[22] Filed: Jul. 6, 1994

[30] Foreign Application Priority Data

Jul. 6, 1993 [DE] Germany .................. 43 22 372.9

[51] Int. Cl.$^6$ .................................................. G10L 5/06
[52] U.S. Cl. .................. 395/2.41; 395/2.42; 395/2.5
[58] Field of Search ............................. 395/2.4, 2.41, 395/2.42, 2.45, 2.35, 2.5, 2.52

[56] References Cited

U.S. PATENT DOCUMENTS

| 5,001,761 | 3/1991 | Hattori | 381/46 |
| 5,228,087 | 7/1993 | Bickerton | 381/43 |
| 5,263,107 | 11/1993 | Ueda et al. | 382/14 |
| 5,278,911 | 1/1994 | Bickerton | 381/43 |
| 5,361,324 | 11/1994 | Takizawa et al. | 395/2.42 |
| 5,404,422 | 4/1995 | Sakamoto et al. | 395/2.41 |

FOREIGN PATENT DOCUMENTS

| 0435282 | 7/1991 | European Pat. Off. | G10L 9/00 |
| 4024890 | 8/1990 | Germany . | |

OTHER PUBLICATIONS

"Recent Achievements in Speech Processing Technologies and Their Applications", M. Immendoerfer et al, *Electrical Communications*, vol. 62, No. 3/4, 1988, pp. 288–293.
"Improved Automatic Recognition of Speech in Noise and Lombard Effect", J. Hansen et al, *EUSIPCO* 1992, Brussels, pp. 403–406.

"The Variability of Speech Produced in Noise", J. Junqua, *ESCA Workshop on Speech Processing in Adverse Conditions*, Cannes, France, 1992, pp. 43–51.
"Noise–Robust Speech Recognition by Template Adaptation", S. Dvorak et al, DAGA 1991, Bochum, pp. 1–3.
"Robust Speaker–Independent Word Recognition Using Static, Dynamic and Acceleration Features: Experiments with Lombard and Noisy Speech", B. Hanson et al, *IEEE ICASSP* 1990, pp. 857–860.
"Noise–Robust Speech Recognition Using a Cepstral Noise Reduction Neural Network Architecture", H. Sorensen, *International Joint Conference on Neural Networks*, Jul. 8–12, 1991, Seattle, pp. II–795–II800.
"Robust Speech Parameters Extraction for Word Recognition in Noise Using Neural Networks", L. Barbier et al, *International Conference on Acoustics, Speech, and Signal Processing*, May 14–17, 1991, Toronto, pp. 145–148.
ICASSP–93. Anglade et al., "Speech discrimination in adverse conditions using acoustics knowledge and selectively trained neural network", pp. 279–82 vol. 2, Apr. 1993
ICASSP 91. Sorensen, "A cepstral noise reduction multilayer neural network", pp. 933–6 vol. 2, May 1991.
ICASSP 90. Hnason et al., "Robust speaker–independent word recognition using static, dynamic and acceleration features: experiments with Lombard and Noisy speech", pp. 857–860 vol. 2, Apr. 1990.

*Primary Examiner*—Allen R. MacDonald
*Assistant Examiner*—Richemond Dorvil
*Attorney, Agent, or Firm*—Ware, Fressola, Van Der Sluys & Adolphson LLP

[57] ABSTRACT

Speech recognition of Lombard-induced speech at a high rate of recognition is shown using a neural network (NN) utilizing nonlinear imaging characteristics. In a training phase, systematic parameter changes of Lombard-induced speech are trained to a neural network. In a speech recognition phase, imaging of Lombard-induced speech patterns to Lombard-free speech patterns takes place through the trained parameter changes.

11 Claims, 4 Drawing Sheets

METHOD AND APPARATUS FOR IMPROVED SPEECH RECOGNITION FROM STRESS-INDUCED PRONUNCIATION VARIATIONS WITH A NEURAL NETWORK UTILIZING NON-LINEAR IMAGING CHARACTERISTICS

TECHNICAL FIELD

The invention concerns a method and a device for recognizing speech with stress-induced pronunciation variations, or speech with noisy and stress-induced pronunciation variations.

BACKGROUND OF THE INVENTION

Studies of the changes in speech under stress conditions are already well known in the state of the art. The effect of changes in speech under stress conditions is known as the "Lombard Effect", named after its inventor Etienne Lombard. This effect says that, e.g., the word duration and, e.g., the pronunciation frequencies change with stress. The word duration increases demonstrably. In this instance, stress means a very noisy environment or a second activity, which claim a portion or a large portion of the concentration.

Automatic speech recognition systems, which serve to recognize speaker-dependent and also speaker-independent speech, use special additional information that takes changes in speech under the Lombard effect into consideration. Different results are respectively obtained for speaker-dependent and for speaker-independent speech recognition.

The traditional methods such as, for example, clustering techniques, stochastic modeling or neural networks, are different possibilities for speech recognition. In this instance a selectively trained neural network method is used to recognize isolated words in which the Lombard effect is reduced. For example, a recognition accuracy of 85% is achieved with this method ("The Variability of Speech Produced in Noise"; Jean-Claude JUNQUA, ESCA Workshop on Speech Processing in Adverse Conditions; Cannes, France; pp. 43–51, 1992).

Furthermore, methods for automatic speech recognition are known in the state of the art, which use the static, dynamic and acceleration characteristics of speech to perform speaker-independent speech recognition. The methods are used for Lombard-type as well as for noisy speech, and produce different results. Combining the individual methods also produces different results. Consequently there are problems, particularly with speaker-dependent speech recognition. ("Robust Speaker-Independent Word Recognition Using Static, Dynamic and Acceleration Features: Experiments with Lombard and Noisy Speech"; Brian A. Hanson and Ted H. Applebaum IEEE ICASSP 1990; pp. 857–860; 1990).

A method for automatic speech recognition under the effect of environmental pronunciation variations is known from the German patent application DE-4024 890.9. Here, after the recognition phase is completed, a new reference speech sample is calculated and stored by means of weighted averaging of an accurately recognized speech sample and its reference speech sample. A further description and explanation of the achieved results, e.g., when using the system in an office environment or in a vehicle at different speeds, has also been published (Noise-Robust Speech Recognition by Template Adaption"; S. Dvorak and T. Hörmann; DAGA 1991, Bochum, pp. 1–3).

Also known in the state of the art is a so-called LC-MBCE-HMM algorithm (Lombard Compensation, Morphological Based Constrained Enhancement, Hidden Markov Model) for automatic speech recognition in noise and occurrence of the Lombard effect. This method achieved an improvement of the recognition rate from 36.44% to 77.78% ("Improved Automatic Recognition of Speech in Noise and Lombard Effect", John H. L. Hansen, Oscar N. Brier; EUSIPCO 1992, Brussels, pp. 403–406).

Hardware for carrying out speech processing technologies and their applications using microprocessor technology is shown, for example, in the article "Recent Achievements in Speech Processing Technologies and Their Applications", by M. Immendoerfer et al, as published in *Electrical Communication*, Vol. 62, No. 3/4, 1988, wherein a high-performance speech processing system is disclosed comprising three main functional units: a front-end unit for digital signal processing, a dynamic time warping (DTW) unit for fast template matching, and a microprocessor for system control. These three units share a common local bus specifically designed for fast data exchange. FIG. 2 of that article and the accompanying text on page 290 show the details of the front-end board for digital signal processing. The DTW unit is also described on that page in connection with FIG. 3. Similarly, the microprocessor unit is described at page 291 in connection with FIG. 4. These detailed descriptions are hereby incorporated by reference in particular, and the entire article in general for background information.

The recognition rate of all the indicated processes and methods with the Lombard effect and/or noisy speech, needs to be increased.

The stress situation of the speaker can be very high, particularly when speech recognizers are used in a vehicle, or even in an office environment. Speech changes considerably in a vehicle at high velocity, because of the stress situation as well.

SUMMARY OF THE INVENTION

The task of the invention is therefore to enable a high speech recognition rate.

According to the present invention, a speech input with stress-induced pronunciation variations or with stress-induced pronunciation variations in noisy environments is processed by means of a neural network utilizing nonlinear imaging characteristics and which maps speech patterns altered by stress to normal speech patterns, or speech patterns altered by stress in noisy environments to noise-reduced normal speech patterns. Such a method can be carried out by means of a device for inputting speech including stress-free speech and stress-induced speech to a device for carrying out a training phase for a neural network that is used during a speech recognition phase in conjunction with means for carrying out speech recognition having access to the neural network and to third means which, utilizing nonlinear imaging characteristics of the neural network, map speech patterns input for recognition affected by stress or speech patterns affected by stress in noisy environments to normal or normal noise-reduced speech patterns.

It is particularly advantageous with the indicated method and apparatus that there is no limitation to isolated words. The indicated method recognizes sentences consisting of multiple words.

It is furthermore of special advantage that good results can also be obtained with speaker-dependent speech recognition. Accordingly, this method can be used without problems for speaker-dependent and for speaker-independent speech recognition.

Another important advantage with the method is that automatic training can take place with the use of neural networks. With other methods, the word to be learned must be repeated several times. But this is demanding, since it is difficult to repeat the very same word under the same conditions. However, neural networks have the advantageous possibility of automatic training.

It is also advantageous that an objective measure of the progress of imaging the noisy speech pattern to the noise-free speech pattern can already be observed during the neural network's training phase. For example, forming a quadratic imaging error between the speech patterns can minimize an error. The usual methods require optimizing the word that has been recognized by the speech recognizer, which requires an additional dependence on the speech recognizer itself.

Another advantage is that the method of the invention can be combined with other methods to reduce, for example, the Lombard effect, and to reduce additive noise.

In further accord with the present invention, the neural network is trained on systematic parameter changes of stress-induced pronunciation variance, e.g., the Lombard effect, and of stress-induced, noisy pronunciation variance based on representative data material, and wherein the neural network, trained by the systematic parameter changes, carries out an imaging to the normal speech patterns or to the noise-reduced normal speech patterns in processing the speech input.

According further to the method of the present invention, it is particularly advantageous to search for corresponding speech patterns during the training phase by means of the so-called linear Dynamic Time Warping (DTW). This method, which is known from speech adaption, can contribute advantageously to the search for corresponding speech patterns.

In further accord with the method of the present invention, dialect- and accent-dependent pronunciation variations can also be trained, which are present with a number of speakers and are expressed from time to time to a greater or lesser extent.

In still further accord with the present invention, an apparatus for recognizing speech with stress-induced pronunciation variations or with stress-induced pronunciation variations in noisy environments comprises a device for inputting speech, first means for carrying out training for a neural network which is responsive to both stress free and stress induced speech inputs and which has access to the neural network, second means for carrying out speech recognition of mixed speech input and having access to the neural network, and third means, utilizing nonlinear imaging characteristics of the neural network for mapping speech patterns affected by stress or speech patterns affected by stress in noisy environments to normal or normal noise-reduced speech patterns. Additional means such as a second neural network may be added for reducing additive background noise.

These and other objects, features and advantages of the present invention will become more apparent in light of the detailed description of a best mode embodiment thereof, as illustrated in the accompanying drawing.

BEST MODE FOR CARRYING OUT THE INVENTION

In the following, a configuration example of the method and the device according to the invention is explained by means of FIG. 1.

With the method and the device according to the invention, speech is subdivided into speech with stress-induced pronunciation variations, speech with stress-induced pronunciation variations plus ambient noise, and stress-free plus noise-free speech.

A configuration example explained here addresses, for example the stress-induced pronunciation variations that are known by the name of Lombard effect, and the stress-free pronunciation characteristics.

Changes in pronunciation take place in a stress situation such as, e.g., when driving an automobile at high speed. The essential characteristics have previously been explained.

In the case of speech recognition, the problem can occur that a word spoken under stress can no longer be recognized, because the word that is known to the speech recognizer had previously been pronounced in a stress-free situation, and the changes in characteristics are not known to the speech recognizer.

A neural network NN with nonlinear imaging characteristics is used, according to the invention, to perform the speech recognition. Using the nonlinear imaging characteristics, this neural network NN images stress-induced speech patterns or stress-induced plus noisy speech patterns to stress-free or stress-free plus noise-reduced speech patterns.

No concrete imaging function needs to be provided when nonlinear imaging characteristics are used. Accordingly, the parameters of the imaging function require no individual optimization, but the whole imaging is optimized as such.

A device for recognizing speech with stress-induced pronunciation variations or stress-induced pronunciation variations in a noisy environment, may include a device for inputting speech $E_1$, $E_2$, $E_3$.

The first speech input $E_1$ serves to input stress-free speech, the second speech input $E_2$ serves to input stress-induced speech. The third speech input $E_3$ serves to input mixed speech, which means that the read-in speech can be both stress-free and stress-induced.

The device further comprises first means A for performing the training of a neural network NN. The first means A can access both the first and also the second speech input $E_1$ and $E_2$.

There is a connection to the neural network NN between the first means A. The first means A trains the neural network NN, as explained in more detail later.

The neural network NN is connected to second means B, which has access to the trained neural network NN. The second means B serves to recognize speech. Mixed speech, which is to be recognized by the second means B, is input via the third speech input $E_3$.

The device for speech recognition also comprises third means C, which images the stress-induced speech patterns to stress-free speech patterns, utilizing the nonlinear characteristics of the neural network NN.

Figure 1:
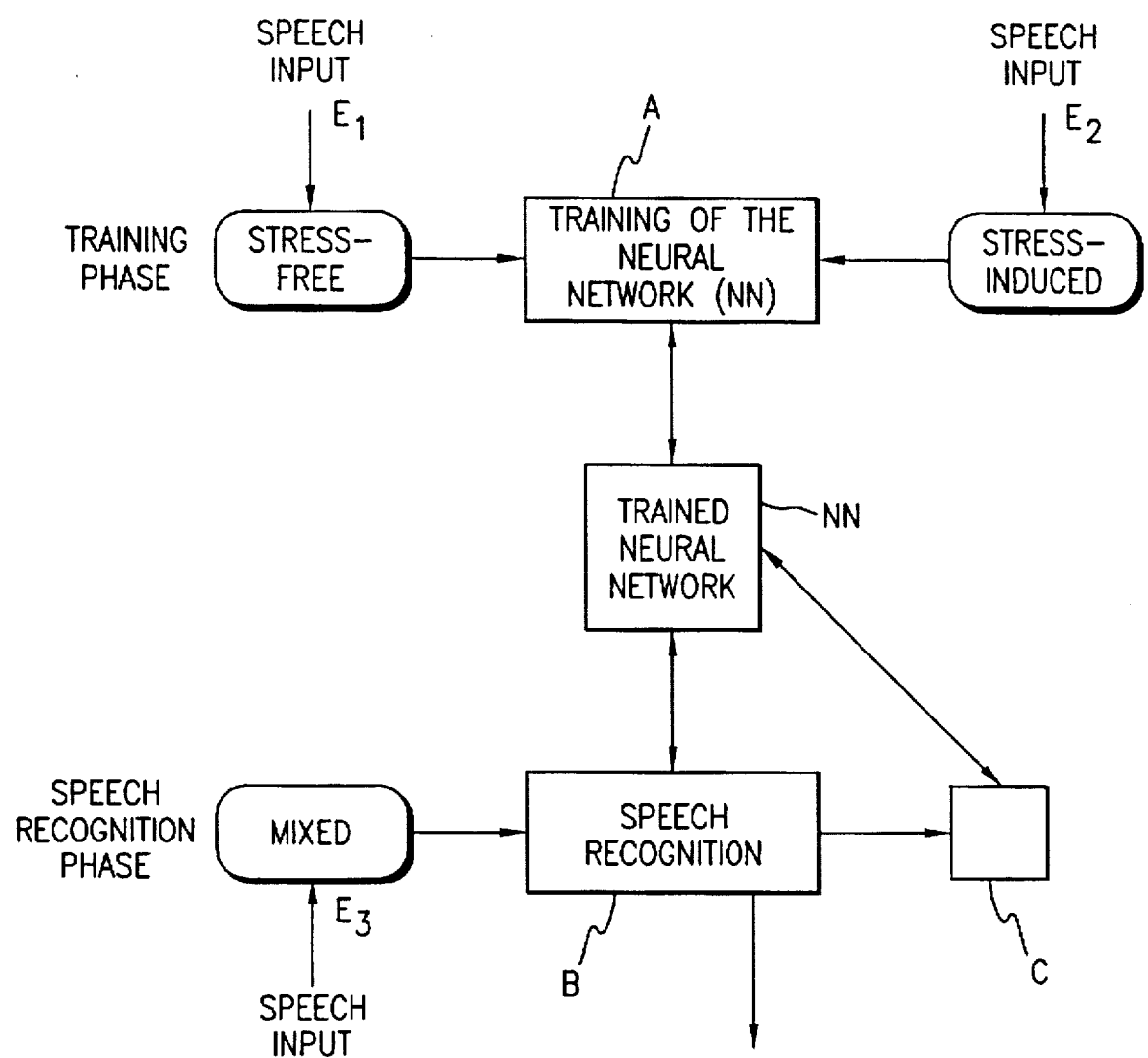
FIG. 1 is a block circuit diagram of a configuration example of the invention.
Figure 3:
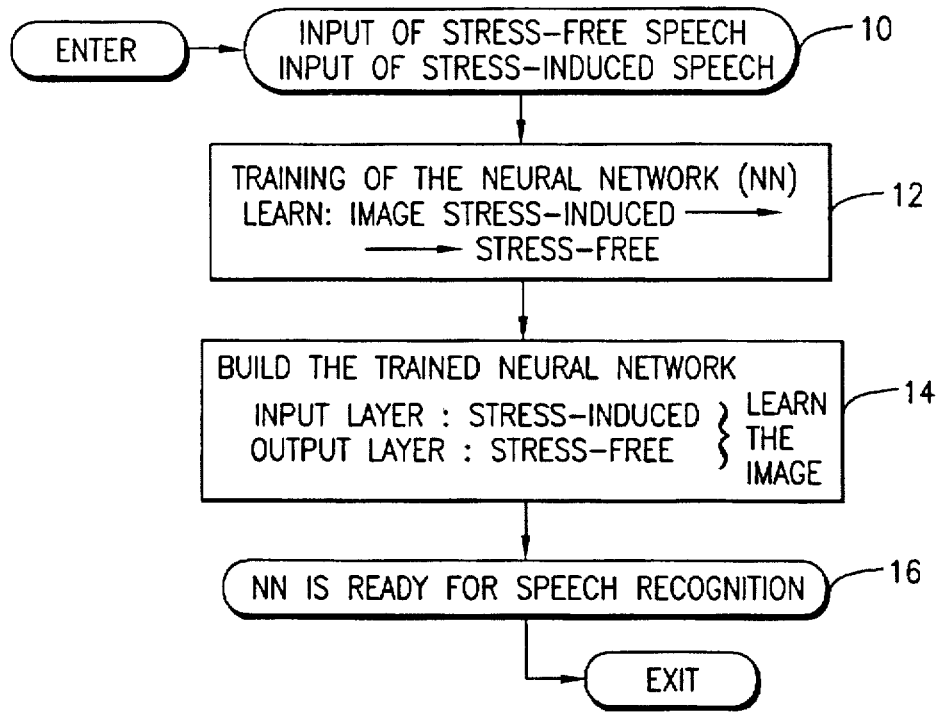
FIG. 3 shows a training phase for the neural network of FIGS. 1 and 2.

During a training phase, illustrated in FIG. 1, both stress-free and stress-induced speech are supplied to means A for training of the neural network NN. This is illustrated in a step 10 in FIG. 3 which shows a training phase. The pronunciation variations between the stress-free speech and the stress-induced speech are subject to systematic parameter changes. The systematic parameter changes are learned and trained as shown in steps 12, 14 from representative data material, that is, for example, from data material that was acquired from a stress-free environment, and from data material that was, e.g., acquired while driving a car or working in a noisy environment.

The error between the speech patterns can already be minimized during the training phase, e.g., by formation of the quadratic imaging error. Accordingly, optimization can take place independently of the speech recognizer that is being used.

After the training phase is completed, the results are supplied to the trained neural network NN and are always available for speech recognition as indicated in a step 16.

Figure 4:
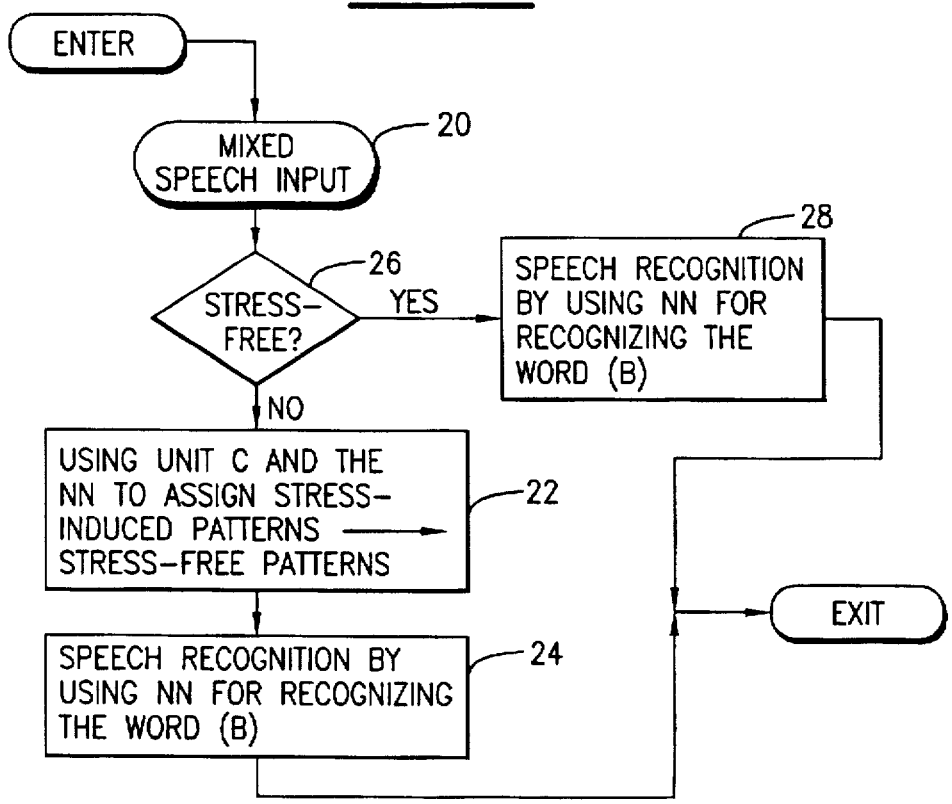
FIG. 4 shows a recognition phase for the neural network of FIG. 1.

During operation of the speech recognizer, as shown in FIGS. 1 and 4, the speech recognition phase accesses the second means B in the trained network NN when speech is made available for recognition via the third speech input $E_3$. The speech input is also shown in a step 20 in FIG. 4.

The third means C serves, as shown in a step 22, to image the stress-induced speech patterns to stress-free speech patterns. This takes place with the aid of the nonlinear imaging characteristics of the neural network.

The second means B for speech recognition can read out or pass on a recognized word or a number of recognized words, as shown in a step 24. If the speech input is stress-free, as determined in a step 26, then speech recognition can take place in a step 28 without using the unit C.

Figure 5:
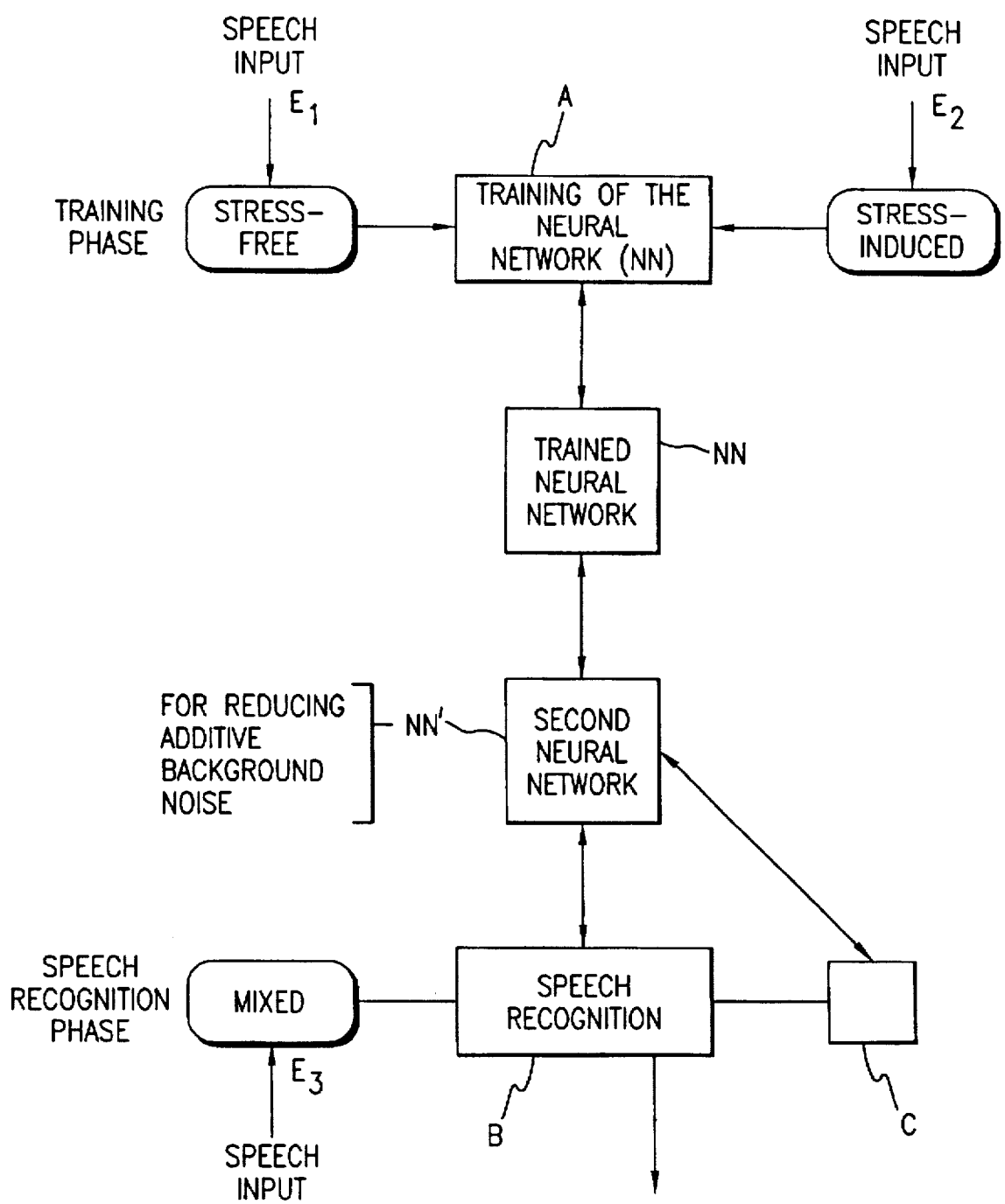
FIG. 5 shows FIG. 1 augmented by additional means for reducing additive background noise.

In addition to the imaging of stress-induced speech patterns to stress-free speech patterns, the above described device and the also described method can produce a reduction in additional noise. Additive background noise can be reduced as shown in FIG. 5, e.g., by additional means such as a second neural network.

The above explained methods and the devices can also be used to recognize speech altered by a dialect or an accent, when the dialect-induced pronunciation variations are trained for their systematic parameter changes.

As explained earlier, stress-free and stress-induced speech must be available during the training phase. However the production of stress-free speech is difficult, e.g., since a word that was previously generated and acquired under stress is very difficult to generate and acquire free of stress. Time period fluctuations, e.g., in the word plane, are particularly subject to problems. For example, a word of several syllables is difficult to reproduce identically under stress and without stress.

Figure 2:
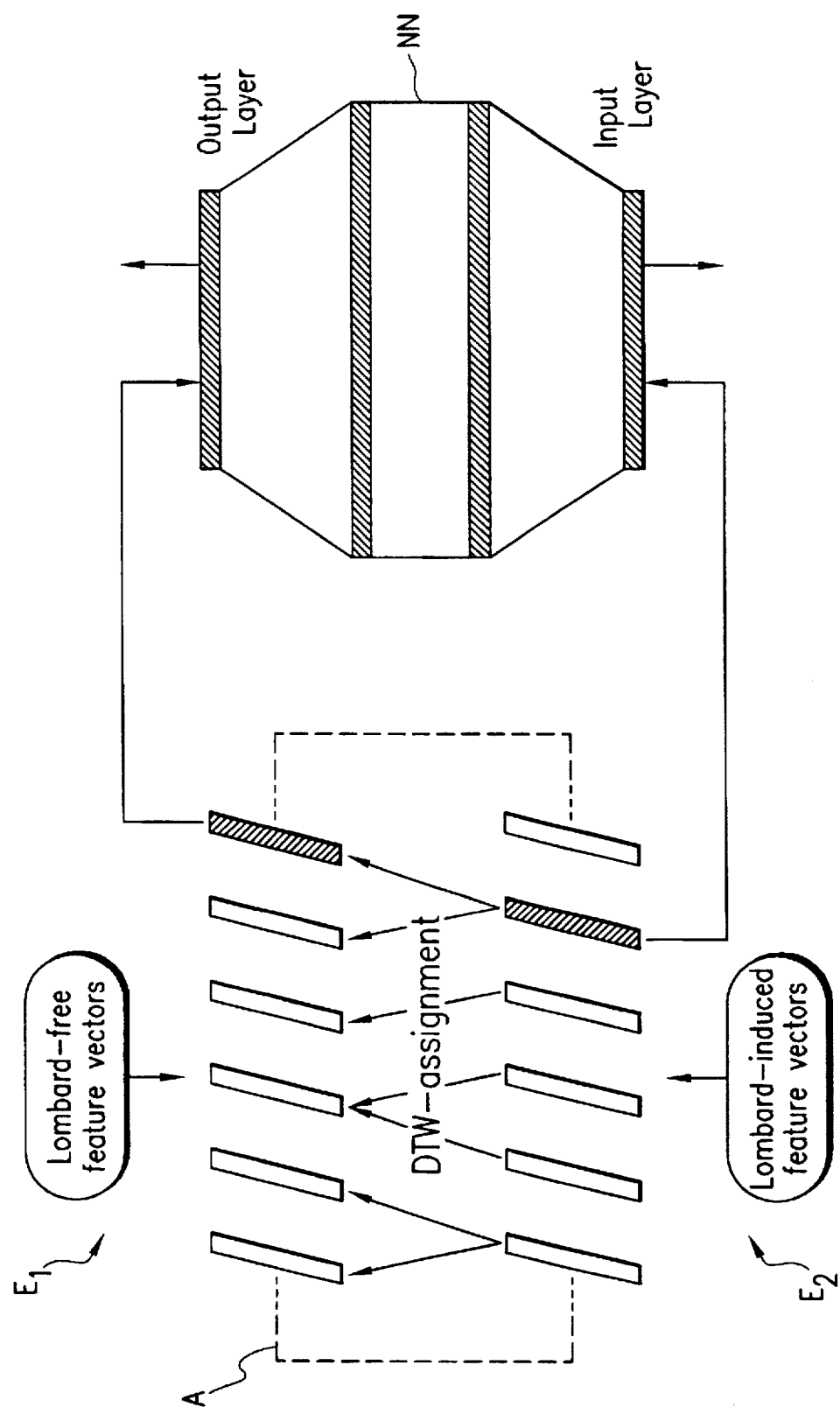
FIG. 2 is a block circuit diagram of a configuration example for performing the training method according to the invention.

The following provides a solution to the problem by means of FIG. 2, which shows the search for corresponding sections in the speech patterns by using nonlinear dynamic time warping (DTW). Nonlinear dynamic time warping is a standard pattern recognition method known from speech adaption, with which the word plane is searched for corresponding speech sections, which in turn are used to train the neural network NN.

According to the invention, nonlinear dynamic time warping, hereafter called DTW, is used in a feature vector plane, as shown in FIG. 2. The spoken words are normalized to a constant number k of feature vectors by means of DTW, for example to k=40. The search for corresponding places in the word takes place in both in stress-free and in stress-induced feature vectors. The training of the neural network NN for imaging and the imaging during speech recognition take place on a vector basis, because the DTW has found corresponding signal sections.

Another possibility (not illustrated) is the use on the basis of word subunits such as e.g. phonemes, diphones, vowels, consonants, syllables or parts of syllables. In this case as well, the lengths of the word subunits are normalized to the same number of feature vectors. Corresponding signal sections are assigned by means of DTW with this method as well. The training of the neural network NN takes place in the word subunit plane and the reduction of the speech variations due to the effect of stress takes place in the feature vector plane or on the basis of the word subunits.

Another possibility is the normalization to a whole word. The reduction of the stress effect on the speech then also takes place in the whole word plane.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of recognizing stress-free speech and speech with stress-induced pronunciation variations, comprising the steps of:

receiving a speech input;

determining if the speech input is stressed or stressed-free;

if the speech is stress-free, carrying out speech recognition using speech recognition means having access to a neural network; and if the speech input is stressed:

(a) using the neural network to map the stressed speech input to stress-free speech, utilizing nonlinear imaging characteristics that account for the systematic parameter changes that occur when speech is produced under stress; and (b) carrying out speech recognition of the stress-free speech using speech recognition means having access to the neural network.

2. A method as claimed in claim 1, further comprising a step of training the neural network (NN) on systematic parameter changes of stress-induced pronunciation variants based on representative data material, and wherein the neural network, trained in the systematic parameter changes, carries out a mapping to stress-free speech patterns in said step of mapping the speech input to stress-free speech.

3. A method as claimed in claim 2, wherein during said step of training the neural network, a search is made section by section for corresponding stress-free and Lombard speech patterns or for corresponding noise-free stress-free and noisy Lombard speech patterns using dynamic time warping (DTW).

4. A method as claimed in claim 1, further comprising a step of training the neural network (NN) for accent-dependent and/or dialect-dependent pronunciation changes.

5. The method of claim 1, further comprising the step of:

before mapping the speech input to stress-free speech and before performing speech recognition, processing the speech input with a second neural network (NN') to reduce additive background noise.

6. Apparatus for recognizing stress-free speech and speech with stress-induced pronunciation variations, comprising:

a device for providing a speech input;

a neural network (NN) for processing the speech input;

a first means (A) for training the neural network (NN);

a second means (B) for carrying out speech recognition on stress-free speech and having access to the neural network (NN);

a third means (C) which, utilizing nonlinear imaging characteristics of the neural network (NN), characteristics that account for the systematic parameter changes that occur when speech is produced under stress, maps speech patterns affected by stress to stress-free speech patterns; and means for providing said speech input directly to said second means if said speech is stress-free, and for providing said speech in-out to said third means if said speech in-put is produced under stress.

7. Apparatus as claimed in claim 6, wherein a second neural network is added for reducing additive background noise.

8. Apparatus as claimed in claim 6, wherein an additional means is provided for reducing additive background noise.

9. A method of speech recognition comprising the steps of during a training phase:

supplying stress-free and stress-induced speech to a training means for training a neural network; and training the neural network on systematic parameter changes of stress-induced pronunciation variants and of stress-induced, noisy pronunciation variants based on representative data material; and during speech recognition:

receiving a speech input with mixed speech including stress-free speech, speech with stress-induced pronunciation variations or speech with stress-induced pronunciation variations in noisy environments;

if the speech includes speech with stress-induced pronunciation variations or speech with stress-induced pronunciation variations in noisy environments:

processing the speech input with the neural network (NN), utilizing nonlinear imaging characteristics, by mapping speech patterns altered by stress to stress-free speech patterns, or speech patterns altered by stress in noisy environments to noise-reduced stress-free speech patterns; and carrying out speech recognition using speech recognition means having access to the neural network; and if the speech includes stress-free speech:

carrying out speech recognition using speech recognition means having access to the neural network.

10. A method as claimed in claim 9, wherein during said step of training the neural network, a search is made section by section for corresponding stress-free and Lombard speech patterns or for corresponding noise-free stress-free and noisy Lombard speech patterns using dynamic time warping (DTW).

11. A method as claimed in claim 9, further comprising a step of training the neural network (NN) for accent-dependent and/or dialect-dependent pronunciation changes.

\* \* \* \* \*

UNITED STATES PATENT AND TRADEMARK OFFICE
CERTIFICATE OF CORRECTION

PATENT NO. : 5,758,022
DATED : May 26, 1998
INVENTOR(S) : Trompf et al.

It is certified that error appears in the above-identified patent and that said Letters Patent is hereby corrected as shown below:

Column 7 (claim 6, line 18) delete [in-out] and insert --input--

Column 7 (claim 6, line 19) delete [in-put] and insert --input--

Signed and Sealed this

Eleventh Day of August 1998

Attest:

BRUCE LEHMAN

*Attesting Officer*  *Commissioner of Patents and Trademarks*